(12) United States Patent
Lee et al.

(10) Patent No.: US 11,797,176 B1
(45) Date of Patent: Oct. 24, 2023

(54) INPUT AREA SEGMENTATION FOR A TOUCH-BASED USER INPUT DEVICE

(71) Applicant: Dell Products L.P., Round Rock, TX (US)

(72) Inventors: Hsu Feng Lee, Taipei (TW); Karthikeyan Krishnakumar, Austin, TX (US); Chiu-Jung Tsen, Zhubei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/811,033

(22) Filed: Jul. 6, 2022

(51) Int. Cl.
*G06F 3/033* (2013.01)
*G06F 3/04886* (2022.01)
*G06F 3/0354* (2013.01)
*G06F 3/14* (2006.01)

(52) U.S. Cl.
CPC ...... *G06F 3/04886* (2013.01); *G06F 3/03547* (2013.01); *G06F 3/1446* (2013.01); *G06F 3/03545* (2013.01)

(58) Field of Classification Search
CPC .. G06F 3/033; G06F 3/03545; G06F 3/03547; G06F 3/041; G06F 3/04886; G06F 3/1423; G06F 3/1446
See application file for complete search history.

(56) References Cited

U.S. PATENT DOCUMENTS

| | | | | |
|---|---|---|---|---|
| 9,436,304 | B1* | 9/2016 | Leiba | G06F 1/1616 |
| 2009/0115724 | A1* | 5/2009 | Yamamoto | G06F 3/0346 |
| | | | | 345/158 |
| 2013/0127738 | A1* | 5/2013 | Miller | G06F 3/03547 |
| | | | | 345/173 |
| 2020/0356590 | A1* | 11/2020 | Clarke | G06F 3/0482 |
| 2020/0371664 | A1* | 11/2020 | Krishnakumar | G06F 3/013 |
| 2020/0379632 | A1* | 12/2020 | Edwards | G06F 3/0482 |
| 2020/0379638 | A1* | 12/2020 | Zhu | G06F 3/016 |

* cited by examiner

*Primary Examiner* — Joe H Cheng
(74) *Attorney, Agent, or Firm* — Norton Rose Fulbright US LLP (57) ABSTRACT

A computing device may segment an input area of an user input device (e.g., the surface of a trackpad) into multiple subsets. At a given time, the computing device may use one of the multiple subsets for mapping to a display device (e.g., instead of mapping the entire input area to the display device). To illustrate, based on receiving user input in one of the multiple subsets, the computing device may map that subset to the display device so that the subset is represented at the display device (e.g., without representing the other subsets at the display device). By segmenting the input area, an aspect ratio of a segment may be matched to an aspect area of the display device. Accordingly, distortions associated with an aspect ratio mismatch between the input area and the display device may be reduced or avoided.

20 Claims, 6 Drawing Sheets

602
Receive user input via a touch-based user input device that is associated with an input area and a user input device aspect ratio, where the user input is received within a subset of the input area, and where an aspect ratio associated with the subset of the input area is different than the user input device aspect ratio

603
Based on the user input, identifying the subset from among a plurality of subsets of the input area of the touch-based user input device

604
Initiate display of a graphical representation associated with the user input at a display device, where a display device aspect ratio associated with the display device is different than the user input device aspect ratio associated with the touch-based user input device, and where the display device aspect ratio associated with the display device corresponds to the aspect ratio associated with the subset of the input area

*FIGURE 6*

INPUT AREA SEGMENTATION FOR A TOUCH-BASED USER INPUT DEVICE

FIELD OF THE DISCLOSURE

The instant disclosure relates to electronic devices, such as information handling systems. More specifically, portions of this disclosure relate to input area segmentation for a touch-based user input device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some circumstances, the variety of hardware and software components may introduce issues that detract from user experience. To illustrate, information received from a peripheral device may be visually presented at a display device of an information handling system. A "mismatch" between the peripheral device and the display device may cause the visual representation to differ from the user input as entered by the user at the peripheral device. As an illustrative example, a difference in physical dimensions between a peripheral device and a display device may distort the visual representation, reducing user experience. In some cases, a user may need to re-enter the user input one or more times, which may be frustrating, and which may use device resources, such as by utilizing processing resources and power consumption of a computing device in some cases.

SUMMARY

In some aspects of the disclosure, a computing device may segment an input area of a touch-based user input device (e.g., the surface of a trackpad) into multiple subsets (also referred to herein as partitions or segments). At a given time, the computing device may use one of the multiple subsets for mapping to a display device (e.g., instead of mapping the entire input area to the display device). To illustrate, based on receiving user input in one of the multiple subsets, the computing device may map that subset to the display device so that the subset is represented at the display device (e.g., without representing the other subsets at the display device).

In some examples, the computing device may determine whether multiple display devices are connected to the computing device. If the computing device detects multiple display devices, the computing device may map different subsets of the input area to respective different display devices. In an illustrative example, based on detecting three display devices, the computing device may segment the input area into a left third segment, a middle third segment, and a right third segment. The computing device may also map the left third segment to a leftmost display device, the middle third segment to a middle display device, and the right third segment to the right display device. In such examples, user input received at the left third segment, the middle third segment, or the right third segment may be graphically represented at the left display device, the middle display device, or the right display device, respectively.

One or more aspects described herein may improve user experience and performance of an electronic device. For example, by segmenting the input area into multiple segments, an aspect ratio of a segment may be matched to an aspect area of the display device. As a result, distortions associated with an aspect ratio mismatch between the input area and the display device (such as where a circle drawn on the input area is visually represented as an oval on the display device due to the aspect ratio mismatch) may be reduced or avoided. Accordingly, user experience may be enhanced by reducing instances of the user needing to re-enter user input, which may reduce usage of processing resources and power consumption of a computing device in some cases.

In some aspects, an apparatus includes a memory and one or more processors coupled to the memory. The one or more processors are configured to receive user input via a touch-based user input device having a user input device aspect ratio. The user input is received within a subset of an input area of the touch-based user input device, and an aspect ratio associated with the subset of the input area is different than the user input device aspect ratio. The one or more processors are further configured to identify, based on the user input, the subset from among a plurality of subsets of the input area of the touch-based user input device, and to initiate display of a graphical representation associated with the user input at a display device having a display device aspect ratio different than the user input device aspect ratio. The display device aspect ratio corresponds to the aspect ratio associated with the subset of the input area.

In some other aspects, a method includes receiving user input via a touch-based user input device that is associated with an input area and a user input device aspect ratio. The user input is received within a subset of the input area, and an aspect ratio associated with the subset of the input area is different than the user input device aspect ratio. The method further includes, based on the user input, identifying the subset from among a plurality of subsets of the input area of the touch-based user input device. The method further includes initiating display of a graphical representation associated with the user input at a display device. A display device aspect ratio associated with the display device is different than the user input device aspect ratio associated with the touch-based user input device, and the display device aspect ratio associated with the display device corresponds to the aspect ratio associated with the subset of the input area.

In some other aspects, an information handling system includes a memory and a processor coupled to the memory. The processor is configured to receive user input via a touch-based user input device that is associated with an input area and a user input device aspect ratio. The user input is received within a subset of the input area, and an aspect ratio associated with the subset of the input area is different than the user input device aspect ratio. The processor is further configured to identify, based on the user input, the subset from among a plurality of subsets of the input area of the touch-based user input device and to initiate display of a graphical representation associated with the user input at a display device. A display device aspect ratio associated with the display device is different than the user input device aspect ratio associated with the touch-based user input device, and the display device aspect ratio associated with the display device corresponds to the aspect ratio associated with the subset of the input area.

Some examples herein may be implemented using an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
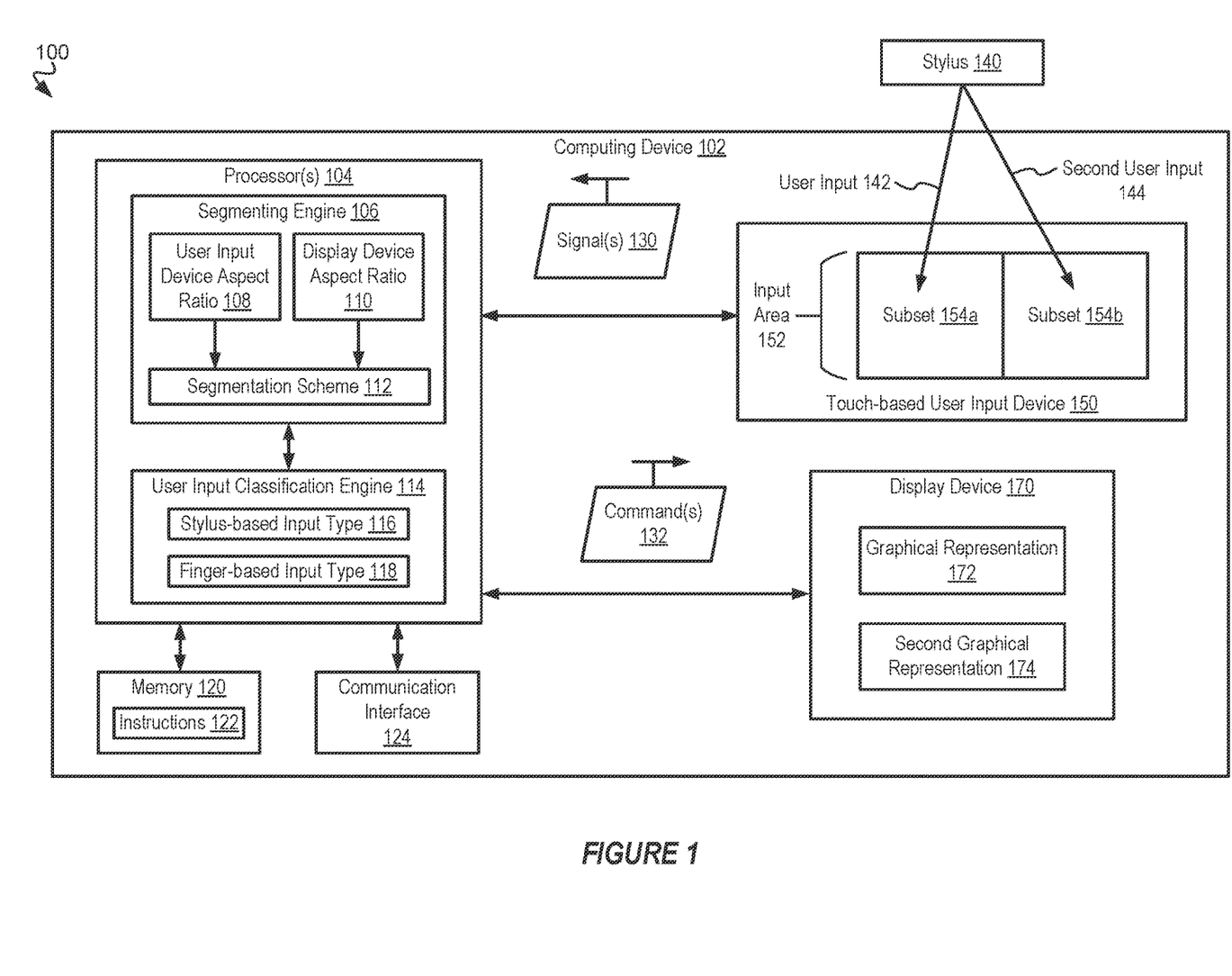
FIG. 1 is a block diagram illustrating an example of a system that includes a computing device according to some aspects of the disclosure.

FIG. 1 is a block diagram illustrating an example of a system 100 according to some aspects of the disclosure. In some examples, the system includes a computing device 102. The computing device 102 may be responsive to a stylus 140. In some examples, the computing device 102 may include or correspond to one or more of a laptop computer, a desktop computer, a tablet computer, a server, a portable device (such as a mobile device, a personal digital assistant (PDA), or a portable media player), or another computing device, as illustrative examples.

The computing device 102 may include one or more processors 104, a memory 120 coupled to the one or more processors 104, and a communication interface 124 coupled to the one or more processors 104. In some examples, the one or more processors 104 include or execute a segmenting engine 106 and a user input classification engine 114. In some implementations, the memory 120 may store instructions 122 executable by the one or more processors 104 to initiate, perform, or control one or more operations described herein.

The computing device 102 may further include or may be in communication with a touch-based user input device 150. Examples of a touch-based user input device include a trackpad (also referred to herein as a touchpad or a touch panel) and a touchscreen. The touch-based user input device 150 may include an input area 152 that is configured to receive user input, such as via one or more of the stylus 140 or a user fingertip. The input area 152 may include a transducer device. In some examples, the transducer device may include capacitive sensors that detect a change of capacitance in the capacitive sensors in response to the user input. Alternatively or in addition, the transducer device may include another type of device, such as resistive sensors, as an illustrative example.

The computing device 102 may further include or may be in communication with one or more display devices, such as a display device 170. For example, the display device 170 may be configured to receive commands from the one or more processors 104 via a wired or wireless connection. The commands may be based on user input received via the touch-based user input device 150.

In some examples, one or both of the touch-based user input device 150 or the display device 170 may be integrated within the computing device 102. For example, the computing device 102 may correspond to a computer (e.g., a laptop computer) in which the one or both of the touch-based user input device 150 or the display device 170 are integrated. In some such examples, one or both of the touch-based user input device 150 or the display device 170 may communicate with the one or more processors 104 via one or more wired connections, such as a bus. The communication interface 124 may include the one or more wired connections. In some other examples, one or both of the one or both of the touch-based user input device 150 or the display device 170 may wirelessly communicate with the one or more processors 104 (e.g., via a wireless communication interface of the communication interface 124).

The touch-based user input device 150 may be associated with a user input device aspect ratio 108, and the display device 170 may be associated with a display device aspect ratio 110. In some implementations, the user input device aspect ratio 108 may be different than the display device aspect ratio 110 (e.g., due to one or more of a physical layout of the computing device 102, an ergonomic criterion, or a form factor of the computing device 102). Further, an aspect ratio may be expressed as W:H, where W indicates a width associated with the aspect ratio, and where H indicates a height associated with the aspect ratio. As a non-limiting example, in some implementations, the user input device aspect ratio 108 may correspond to 48:9, and the display device aspect ratio 110 may correspond to 16:9. Other examples are also within the scope of the disclosure.

During operation, the segmenting engine 106 may identify the user input device aspect ratio 108 and the display device aspect ratio 110. To illustrate, in some implementations, an operating system of the computing device 102 may specify one or more of the user input device aspect ratio 108 and the display device aspect ratio 110. In some other examples, the computing device 102 may identify one or more of the user input device aspect ratio 108 and the display device aspect ratio 110 based on drivers associated with one or more of the touch-based user input device 150 or the display device 170, respectively. In some such examples, the computing device 102 may provide one or more of the user input device aspect ratio 108 or the display device aspect ratio 110 to the segmenting engine 106 upon installing or downloading the drivers.

The segmenting engine 106 may determine a segmentation scheme 112 associated with the touch-based user input device 150 based on the user input device aspect ratio 108 and the display device aspect ratio 110. For example, the segmentation scheme 112 may indicate that the input area 152 is associated with (or segmented into) a subset 154a and a subset 154b that is different than the subset 154a. A subset may also be referred to as a segment, partition, sub-region, or sub-area of the input area 152. The segmenting engine 106 may select or determine the segmentation scheme 112 so that an aspect ratio associated with each subset 154a-b corresponds to the display device aspect ratio 110 or is more similar (than the user input device aspect ratio 108) to the display device aspect ratio 110.

To illustrate, in some examples, the user input device aspect ratio 108 may correspond to 32:9, and the display device aspect ratio 110 may correspond to 16:9. In such examples, the segmenting engine 106 may segmenting the touch-based user input device 150 into two subsets (e.g., the subsets 154a-b) so that each of the two subsets has an aspect ratio of 16:9. In another example, the user input device aspect ratio 108 may correspond to 48:9, and the display device aspect ratio 110 may correspond to 16:9. In such examples, the segmenting engine 106 may segment the touch-based user input device 150 into three subsets so that each of the three subsets has an aspect ratio of 16:9.

In some other examples, the segmenting engine 106 may perform another segmenting of the input area 152, such as where one or more of a width or a height of the user input device aspect ratio 108 corresponds to a non-integer multiple of one or more of a width or a height of the display device aspect ratio 110, respectively. To illustrate, in some examples, the user input device aspect ratio 108 may correspond to 30:9, and the display device aspect ratio 110 may correspond to 16:9. In some such examples, the segmenting engine 106 may segment the input area 152 so that one of the subsets 154a-b has an aspect ratio of 16:9 and so that the other of the subsets 154a-b has an aspect ratio of 14:9. In other such examples, the segmenting engine 106 may segment the input area 152 so that each of the subsets 154a-b has an aspect ratio of 15:9.

The touch-based user input device 150 may be responsive to user input received via the touch-based user input device 150. For example, a user may provide user input 142 to the input area 152 (e.g., via the stylus 140), such as by drawing, writing, or tapping on the input area 152 using the stylus 140. The touch-based user input device 150 may detect the user input 142 using a capacitive sensing technique or using a resistive sensing technique, as illustrative examples.

The touch-based user input device 150 may generate one or more signals 130 based on the user input 142. In some examples, the input area 152 includes a transducer device that generates the one or more signals 130 based on the user input 142 (e.g., using a capacitive sensing technique or using a resistive sensing technique). The touch-based user input device 150 may provide the one or more signals (or a representation of the one or more signals) to the one or more processors 104 (e.g., via a wired or wireless connection to the one or more processors 104, which may be included in the communication interface 124).

The one or more processors 104 may receive the one or more signals 130 from the touch-based user input device 150 and may input the one or more signals 130 (or a representation of the one or more signals 130) to the segmenting engine 106. The segmenting engine 106 may determine (e.g., based on the segmentation scheme 112) a subset of the input area 152 associated with the user input 142. To illustrate, in the example of FIG. 1, the user input 142 may be received in the subset 154a (e.g., where a user begins drawing in the left half of the input area 152).

Based on the segmenting engine 106 identifying that the subset 154a is associated with the one or more signals 130, the one or more processors 104 may initiate a graphical representation of the user input 142 at the display device 170, such as by providing one or more commands 132 to the display device 170 to display a graphical representation 172 associated with the user input 142. The one or more commands 132 may include a representation of the subset 154a (including the user input 142 associated with the subset 154a). In some examples, the one or more commands 132 do not include a representation of the subset 154b. Accordingly, the display device 170 may provide the graphical representation 172 to represent the user input 142 (e.g., without displaying a representation of the subset 154b).

In some examples, an aspect ratio of the subset 154a may correspond to the display device aspect ratio 110. As referred to herein, the aspect ratio of the subset 154a may correspond to the display device aspect ratio 110 if a user would perceive that the graphical representation 172 accurately represents the user input 142 provided via the subset 154a. To illustrate, in some examples, if the display device aspect ratio 110 corresponds to 16:9, and if the aspect ratio of the subset 154a corresponds to 16:9, 14:9, or 15:9, then a user may perceive that the graphical representation 172 accurately represents the user input 142 provided via the subset 154a, such as where the user input 142 includes a circle, and where the graphical representation 172 includes a circle or a circular shape. In such examples, the aspect ratio of the subset 154a corresponds to the display device aspect ratio 110. To further illustrate, if the display device aspect ratio 110 corresponds to 16:9, and if the user input device aspect ratio 108 corresponds to 48:9, then the user input device aspect ratio 108 may not correspond to the display device aspect ratio 110 (e.g., where the user input 142 includes a circle, and where the graphical representation 172 includes an oval). To further illustrate, in some implementations, the computing device 102 may depict the user input 142 at the display device 170 as the graphical representation 172 without scaling the user input 142 based on the display device aspect ratio 110.

In some examples, based on receiving the one or more signals 130, the segmenting engine 106 may select, based on the one or more signals 130, a particular subset as an active area from among subsets indicated by the segmentation scheme 112. The active area may correspond to a particular subset of the segments in which the user input 142 is received, and the graphical representation 172 may correspond to the active area (e.g., by representing user input received in the active area without representing one or more other subsets of the input area 152). To illustrate, the segmenting engine 106 may determine (e.g., prior to receiving the user input 142) multiple subsets of the input area 152, such as the subsets 154a-b. The segmenting engine 106 may select the subset 154a, from among the multiple subsets, as the active area based on the user input 142 being detected within the subset 154a. In such examples, a second subset (e.g., the subset 154b) may be referred to as a non-active area that is not depicted in (e.g., is excluded from) the graphical representation 172.

To further illustrate, in some cases, a portion of the user input 142 may be received via a second subset of the input area 152, such as the subset 154b, which may correspond to a non-active area. In some implementations, based on the portion of the user input 142 being received from the second subset, the portion of the user input 142 may not included in the graphical representation 172.

Further, the segmenting engine 106 may dynamically determine or change the active area of the input area 152 (e.g., based on a change in the user input 142). To illustrate, the segmenting engine 106 may detect an interruption in the user input 142, such as based on a user lifting the stylus 140 from the input area 152, or from the subset 154a of the input area 152, for at least a threshold amount of time. In some implementations, the interruption in the user input 142 may cause the segmenting engine 106 to "suspend" the subset 154a as the active area and may wait until further user input is received to redetermine the active area. After detecting the interruption in the user input 142, the segmenting engine 106 may detect second user input 144 within a particular subset, such as the subset 154b. Based on the second user input 144 within the subset 154b, the segmenting engine 106 may dynamically select the subset 154b as the active area and may initiate display of a second graphical representation 174 of the second user input 144 at the display device 170.

Depending on the particular implementation, upon changing of the active area (e.g., from the subset 154a to the subset 154b), the segmenting engine 106 may retain the graphical representation 172 at the display device 170 or may clear the graphical representation 172 from the display device 170. In some examples, the graphical representation 172 and the second graphical representation 174 may be displayed concurrently at the display device 170, such as in connection with an application in which a user is prompted to manually clear or delete graphical representations created via the touch-based user input device 150. In some other examples, the graphical representation 172 may be removed from the display device 170 based on initiating the display of the second graphical representation 174, such as in connection with an application in which a new graphical representation created via the touch-based user input device 150 automatically clears a prior graphical representation from the display device 170.

In some examples, the user input classification engine 114 may detect a type of input of the user input 142 and may provide an indication of the type of input to the segmenting engine 106. The user input classification engine 114 may determine the type of input using one or more techniques. In some implementations, the width of a finger-drawn user input may be wider in diameter as compared to the width of a stylus-drawn user input. The user input classification engine 114 may assign a stylus-based input type 116 to the user input 142 based on a diameter associated with the user input 142 exceeding a threshold and may assign a finger-based input type 118 to the user input 142 based on the diameter failing to exceed the threshold. In some examples, the diameter may correspond to or may be based on a greatest detected width of the user input 142, a least detected width of the user input 142, an average detected width of the user input 142, or using another technique.

Alternatively or in addition to classifying the type of input based on the width, the user input classification engine 114 may perform the classification using one or more other techniques. In some examples, the user input classification engine 114 may use a machine learning (ML) or artificial intelligence (AI) model to perform the classification. In some implementations, the user input classification engine 114 may be trained to perform the classification using training data (e.g., labeled training data, unlabeled training data, or a combination thereof).

In some examples, the segmenting engine 106 may selectively perform one or more operations described herein based on the type of input of the user input 142. For example, the segmenting engine 106 may apply the segmentation scheme 112 selectively based on the type of input of the user input 142 (e.g., by identifying the subset 154a as the active area based on the type of input of the user input 142 corresponding to the stylus-based input type 116).

In some other examples, based on a type of input corresponding to another type of input (e.g., the finger-based input type 118), the segmenting engine 106 may decline to apply the segmentation scheme 112 to the input. To illustrate, if the segmenting engine 106 receives additional user input via the touch-based user input device 150, and if the additional user input corresponds to the finger-based input type 118, then the segmenting engine 106 may process the additional user input based on the display device aspect ratio 110 and may decline to perform segmenting for the additional user input. In such examples, a graphical representation of the additional user input generated at the display device 170 may include both the subset 154a and the subset 154b.

In some examples, selectively segmenting the input area 152 based on the type of input may improve user experience. For example, for the finger-based input type 118, a user may tend to view the display device 170 (instead of the touch-based user input device 150) as the input is entered at the input area 152. As a result, the user may be likely to "self-correct" (or compensate) for a difference between the user input device aspect ratio 108 and the display device aspect ratio 110, in which case segmentation may be unnecessary or undesirable. In some other examples, for the stylus-based input type 116, a user may tend to view the touch-based user input device 150 (instead of the display device 170) as the input is entered at the input area 152. As a result, after generating the user input 142, the user may be likely to notice a difference in the user input 142 as entered at the input area 152 as compared to the graphical representation 172. By segmenting the input area 152 in such instances, a difference in the user input 142 as entered at the input area 152 and as depicted in the graphical representation 172 may be reduced or avoided, improving user experience.

Figure 2:
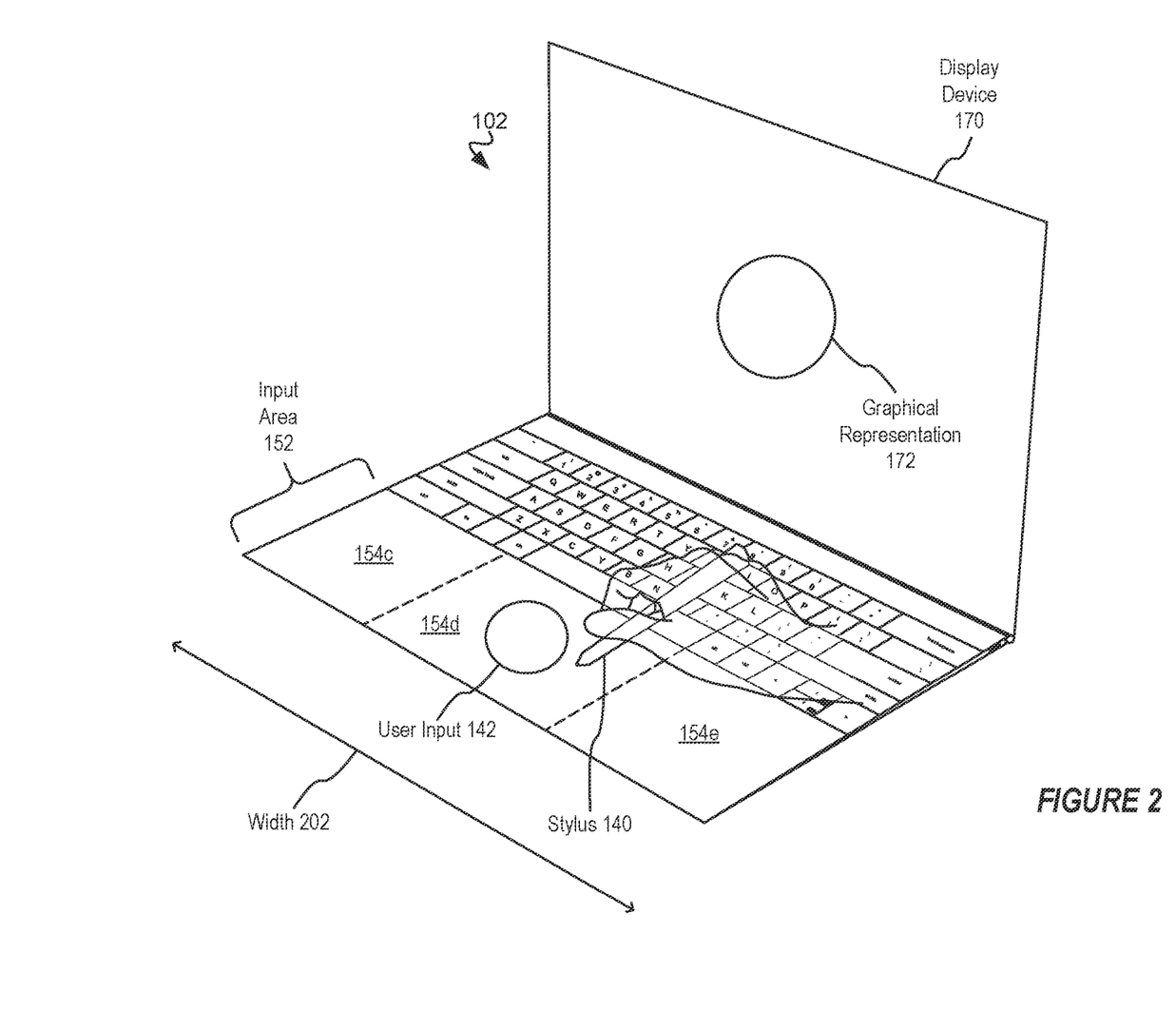
FIG. 2 is a block diagram illustrating an example of the computing device of FIG. 1 according to some aspects of the disclosure.

FIG. 2 is a block diagram illustrating an example of the computing device 102 of FIG. 1 according to some aspects of the disclosure. As illustrated in the example of FIG. 2, the computing device 102 may correspond to a laptop computer. FIG. 2 also illustrates that the input area 152 may be segmented into three subsets 154c, 154d, and 154e. Upon receiving the user input 142 at the subset 154d via the stylus 140, the segmenting engine 106 of FIG. 1 may initiate the graphical representation 172 of the user input 142 at the display device 170.

In some implementations, the touch-based user input device 150 corresponds to a trackpad having a same width as, and extending edge-to-edge with, the display device 170. For example, FIG. 2 depicts that the touch-based user input device 150 and the display device 170 may have the same width 202. In some examples, the touch-based user input device 150 may be referred to as a full palmrest trackpad. Further, as referred to herein, the touch-based user input device 150 may have the same width 202 as, and may extend edge-to-edge with, the display device 170 even if one or both of the touch-based user input device 150 or the display device include a border region, such as the border of a protective enclosure. To illustrate, in some examples, a border region may have a width of approximately 0.1 millimeters (mm) to 10 mm.

Figure 3:
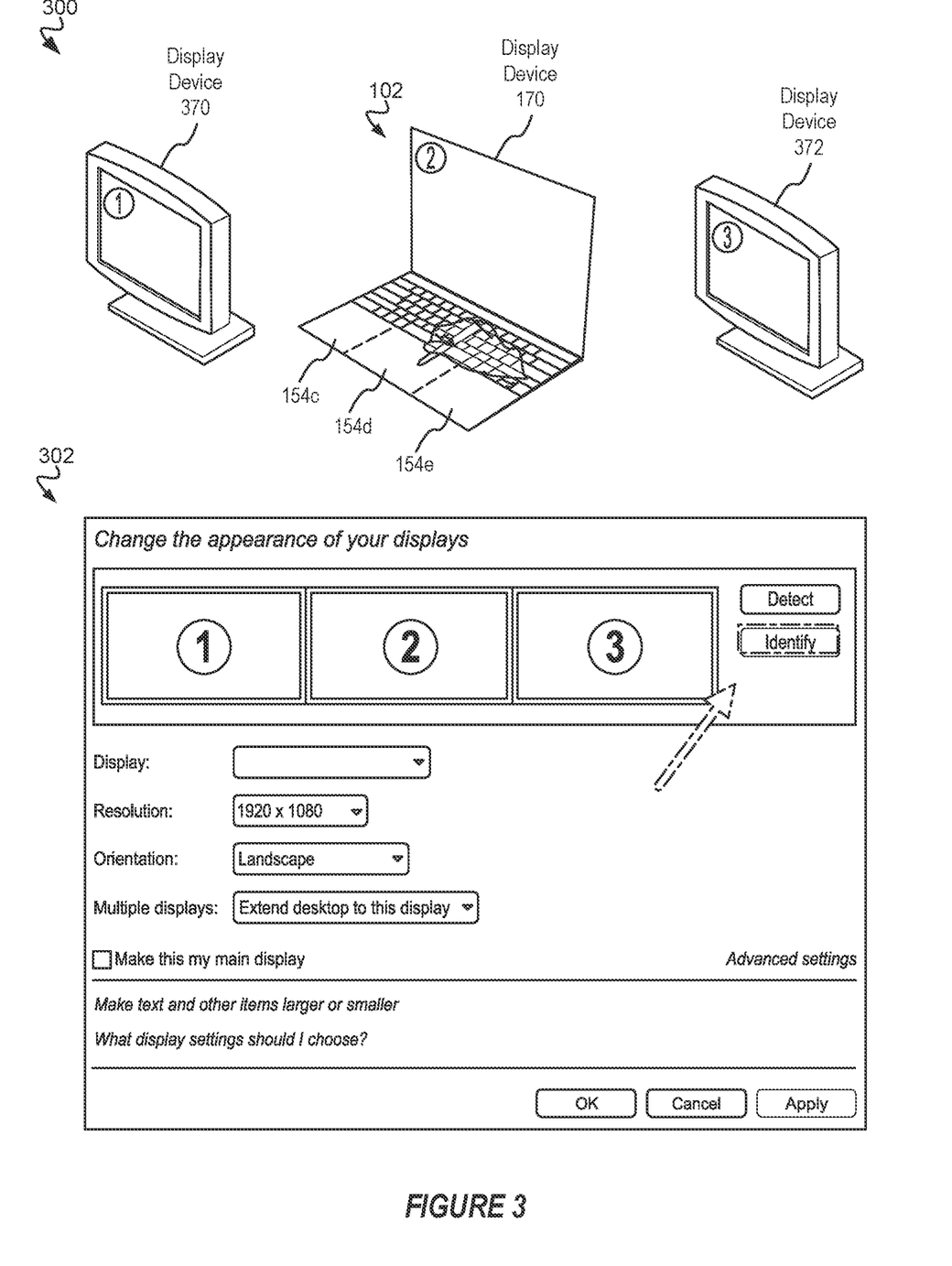
FIG. 3 is a block diagram illustrating another example of a system according to some aspects of the disclosure.

FIG. 3 is a block diagram illustrating another example of a system 300 according to some aspects of the disclosure. The system 300 may include the computing device 102 and may further include a set of display devices. The set of display devices may include the display device 170 of the computing device 102 and may further include one or more additional display devices, such as a display device 370 (e.g., a first external monitor) and a display device 372 (e.g., a second external monitor).

During operation, the computing device 102 may detect the one or more additional display devices. For example, the computing device 102 may detect that the one or more additional display devices are connected (e.g., via a wireless or wired connection) to the computing device 102. The computing device 102 may segment the touch-based user input device 150 based on a quantity of display devices included in the set of display devices.

To illustrate, the example of FIG. 3 illustrates that the quantity of display devices may correspond to three display devices. In such examples, the computing device 102 may segment the input area 152 into three subsets (such as the subsets 154c-e). Other examples are also within the scope of the disclosure. For example, if the quantity of display devices corresponds to two display devices, the computing device 102 may segment the input area 152 into two subsets (such as the subsets 154a-b of FIG. 1).

To further illustrate, segmenting the input area 152 of the touch-based user input device 150 may include mapping each subset of a plurality of subsets of the input area 152 (such as the subsets 154c-e) of the touch-based user input device 150 to a respective display device of the set of display devices (e.g., by assigning each of the subsets 154c-e to a respective display device of the set of display devices).

In some examples, the mapping is based on a physical arrangement of the set of display devices. For example, in FIG. 3, the display device 370 may be positioned to the left of the display device 170, and the display device 170 may be positioned to the left of the display device 372. As a result, the computing device 102 may map a left region of the touch-based user input device 150 (e.g., the subset 154c) to the display device 370, a middle region of the touch-based user input device 150 (e.g., the subset 154d) to the display device 170, and a right region of the touch-based user input device 150 (e.g., the subset 154e) to the display device 372.

Upon receiving user input from one of the subsets 154c-e, the computing device 102 may initiate display of a graphical representation of the user input at a corresponding display of the set of displays based on the mapping. To illustrate, after receiving the user input 142 of FIG. 1 via one of the subsets 154c-e (such as the subset 154d), the computing device 102 may initiate display of the graphical representation 172 at a corresponding display, such as the display device 170. If the touch-based user input device 150 receives the second user input 144 via a second subset of the subsets 154c-e (such as the subset 154c or the subset 154e), the computing device 102 may initiate display of the second graphical representation 174 at a second display (e.g., the display device 370 or the display device 372, respectively). A second display device aspect ratio associated with the second display device may correspond to a second aspect ratio associated with the second subset.

In some examples, the mapping of the set of display devices to the subsets 154c-e may be determined or updated based on settings indicated via an operating system of the computing device 102. For example, the computing device 102 may present a graphical user interface (GUI) 302. The GUI 302 illustrates that a user may request the operating system to identify each display of the set of displays (e.g., using numerals 1, 2, and 3). In some examples, if the user changes the ordering of the displays via the GUI 302, the computing device may update the mapping based on the changed order ordering of the displays. For example, if the user changes the position of the display devices 370 (so that the display device 370 is positioned on the right of the computing device 102, and so that the display device 372 is positioned on the left of the computing device 102), the computing device 102 may update the mapping so that the subset 154c is mapped to the display device 372 and so that the subset 154e is mapped to the display device 370.

Further, although FIG. 3 illustrates that the quantity of subsets of the input area 152 may correspond to the quantity of display devices of the set of display devices, other examples are also within the scope of the disclose. For example, in some cases, the set of display devices may include two display devices. In some such examples, the GUI 302 may prompt a user to select two of the subsets 154c-e to be mapped to the two display devices. Other examples are also within the scope of the disclosure.

In some examples, the segmenting engine 106 stores (or accesses) multiple segmentation schemes 112 associated with different configurations of display devices. For example, if no external monitors are detected (such as in the case of the example depicted in FIG. 1), the segmenting engine 106 may select one segmentation scheme 112, if a quantity of external monitors are detected, the segmenting engine 106 may select another segmentation scheme 112 based on the quantity of external monitors.

Alternatively or in addition, segments of the input area 152 may have different sizes, such as if the subset 154c and the subset 154e each occupy 40 percent of the input area 152 and if the subset 154d occupies 20 percent of the input area 152 (e.g., to account for a larger screen size of the display devices 370, 372 as compared to the display device 170). For example, the segmenting engine 106 may detect (e.g., based on driver information or other data) that a screen size of each of the display devices 370, 372 is twice (or approximately twice) a screen size of the display device 170. In such examples, the segmenting engine 106 may allocate a left 40 percent of the input area 152 as the subset 154c to the display device 370, a middle 20 percent of the input area 152 as the subset 154d to the display device 170, and a right 40 percent of the input area 152 as the subset 154e to the display device 372. Other examples are also within the scope of the disclosure.

Alternatively or in addition, a shape of a segment may be selected based on the particular application, such as based on the shape of a display device, which may in some cases be non-rectangular or non-square. To illustrate, in the case of a curved display, a curved (or partially curved) shape (such as a "bowed" or "bowtie" shape) may be selected for a particular segment of the input area 152 in the case of a three-dimensional (3D), nonlinear, or curved display device.

Alternatively or in addition, a different number or orientation of segments may be used, such as by using four segments, five segments, six segments, or another number of segments, or by arranging segments in a direction other than from left to right as illustrated in FIG. 1 and FIG. 3 (e.g., from the top of the input area 152 to the bottom of the input area 152).

Alternatively or in addition, in some examples, a segment may be non-contiguous, such as where a user inputs a multi-touch gesture (e.g., by touching the left side of the input area 152 while also touching the right side of the input area 152). In some such examples, the segmenting engine 106 may dynamically reselect a particular active area that includes both the left side and the right side.

Figure 4:
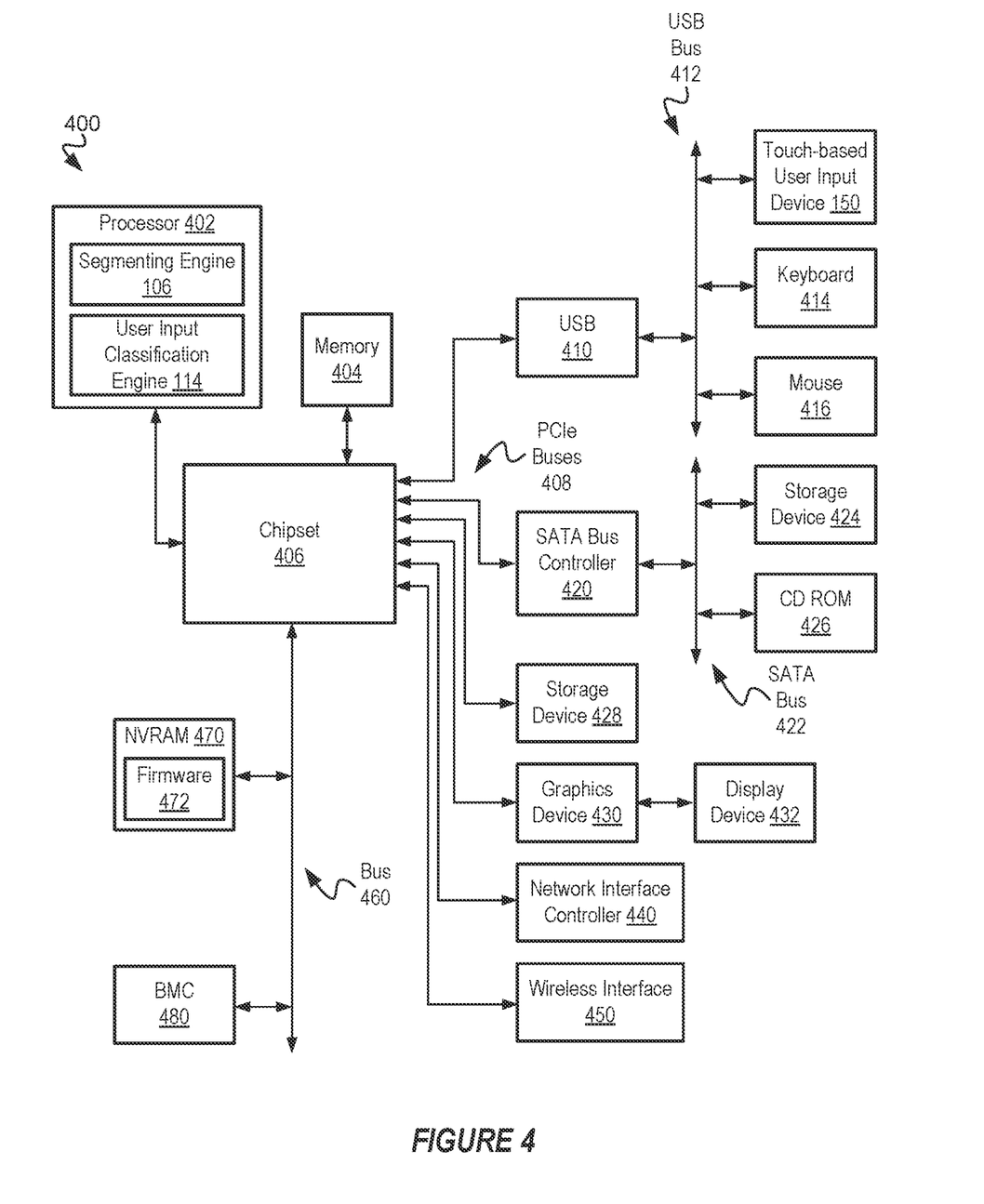
FIG. 4 is a block diagram illustrating an example of an information handling system according to some aspects of the disclosure.

FIG. 4 is a block diagram illustrating an example of an information handling system 400 according to some aspects of the disclosure. In some examples, one or more features of the information handling system 400 may be implemented at the computing device 102, the system 300, or a combination thereof.

Information handling system 400 may include a processor 402 (e.g., a central processing unit (CPU)), a memory 404 (e.g., a dynamic random-access memory (DRAM)), and a chipset 406. In some examples, one or more of the processor 402, the memory 404, or the chipset 406 may be included in a motherboard (also referred to as a mainboard), which may include a printed circuit board (PCB) with embedded conductors organized as transmission lines between any of the processor 402, the memory 404, the chipset 406, or other components of the information handling system 400. The components may be coupled to the motherboard through packaging connections such as a pin grid array (PGA), ball grid array (BGA), land grid array (LGA), surface-mount technology, and/or through-hole technology. In some embodiments, one or more of the processor 402, the memory 404, the chipset 406, or other components may be organized as a system on chip (SoC).

The processor 402 may execute program code by accessing instructions loaded into memory 404 from a storage device, may execute the instructions to operate on data also loaded into memory 404 from a storage device, and may generate output data that is stored to memory 404 or sent to another component. The processor 402 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 402 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 406 may facilitate the transfer of data between the processor 402, the memory 404, and other components. In some embodiments, chipset 406 may include two or more integrated circuits (ICs), such as a northbridge controller coupled to the processor 402, the memory 404, and a southbridge controller, with the southbridge controller coupled to the other components such as universal serial bus (USB) controller 410, a SATA bus controller 420, and PCIe buses 408. The chipset 406 may couple to other components through one or more PCIe buses 408.

Some components may be coupled to one bus line of the PCIe buses 408, whereas some components may be coupled to more than one bus line of the PCIe buses 408. One example component is the USB controller 410, which may interface the chipset 406 to a USB bus 412. The USB bus 412 may couple input/output components, such as a keyboard 414 and a mouse 416, and also other components, such as USB flash drives, or another information handling system. Another example component is the SATA bus controller 420, which may couple the chipset 406 to a SATA bus 422. The SATA bus 422 may facilitate efficient transfer of data between the chipset 406 and components coupled to the chipset 406 and a storage device 424 (e.g., a hard disk drive (HDD) or solid-state disk drive (SDD)) and/or a compact disc read-only memory (CD-ROM) 426. The PCIe buses 408 may also couple the chipset 406 directly to a storage device 428 (e.g., a solid-state disk drive (SDD)). A further example of an example component is a graphics device 430 (e.g., a graphics processing unit (GPU)) for generating output to a display device 432, a network interface controller (NIC) 440, and/or a wireless interface 450 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example, chipset 406 may be directly connected to an individual end point via a PCIe root port within the chipset and a point-to-point topology as shown in FIG. 4.

The chipset 406 may also be coupled to a bus 460, which may couple the chipset 406 to one or more system management components. For example, a non-volatile random-access memory (NVRAM) 470 storing firmware 472 may be coupled to the bus 460. As another example, a controller, such as a baseboard management controller (BMC) 480, may be coupled to the chipset 406 through the bus 460. BMC 480 may be referred to as a service processor or embedded controller (EC). Capabilities and functions provided by BMC 480 may vary based on the type of information handling system. For example, the term baseboard management system may be used to describe an embedded processor included at a server, while an embedded controller may be found in a consumer-level device. As disclosed herein, BMC 480 may represent a processing device different from processor 402, which provides various management functions for information handling system 400. For example, an embedded controller may be responsible for power management, cooling management, and the like. An embedded controller included at a data storage system may be referred to as a storage enclosure processor or a chassis processor.

Information handling system 400 may include additional processors that are configured to provide localized or specific control functions, such as a battery management controller. Bus 460 can include one or more buses, such as a Serial Peripheral Interface (SPI) bus, an Inter-Integrated Circuit (I2C) bus, a system management bus (SMBUS), a power management bus (PMBUS), or the like. BMC 480 may be configured to provide out-of-band access to devices at information handling system 400. Out-of-band access in the context of the bus 460 may refer to operations performed prior to execution of firmware 472 by processor 402 to initialize operation of the information handling system 400.

Firmware 472 may include instructions executable by processor 402 to initialize and test the hardware components of information handling system 400. For example, the instructions may cause the processor 402 to execute a power-on self-test (POST). The instructions may further cause the processor 402 to load a boot loader or an operating system (OS) from a mass storage device. Firmware 472 additionally may provide an abstraction layer for the hardware, such as a consistent way for application programs and operating systems to interact with the keyboard, display, and other input/output devices. When power is first applied to information handling system 400, the system may begin a sequence of initialization procedures, such as a boot procedure or a secure boot procedure. During the initialization sequence, also referred to as a boot sequence, components of information handling system 400 may be configured and enabled for operation and device drivers may be installed. Device drivers may provide an interface through which other components of information handling system 400 can communicate with a corresponding device. The firmware 472 may include a basic input-output system (BIOS) and/or include a unified extensible firmware interface (UEFI). Firmware 472 may also include one or more firmware modules of the information handling system 400. Additionally, configuration settings for the firmware 472 and firmware of the information handling system 400 may be stored in the NVRAM 470. NVRAM 470 may, for example, be a non-volatile firmware memory of the information handling system 400 and may store a firmware memory map namespace of the information handling system. NVRAM 470 may further store one or more container-specific firmware memory map namespaces for one or more containers concurrently executed by the information handling system.

Information handling system 400 may include additional components and additional buses, not shown for clarity. For example, information handling system 400 may include multiple processor cores (either within processor 402 or separately coupled to the chipset 406 or through the PCIe buses 408), audio devices (such as may be coupled to the chipset 406 through one of the PCIe buses 408), or the like. While a particular arrangement of bus technologies and interconnections is illustrated for the purpose of example, one of skill will appreciate that the techniques disclosed herein are applicable to other system architectures. Information handling system 400 may include multiple processors and/or redundant bus controllers. In some examples, one or more components may be integrated together in an integrated circuit (IC), which may include circuitry built on a common substrate. For example, portions of chipset 406 can be integrated within processor 402. Additional components of information handling system 400 may include one or more storage devices that may store machine-executable code, one or more communications ports for communicating with external devices, and various input and output (I/O) devices, such as a keyboard, a mouse, and a video display.

In some embodiments, processor 402 may include multiple processors, such as multiple processing cores for parallel processing by the information handling system 400. For example, the information handling system 400 may include a server comprising multiple processors for parallel processing. In some embodiments, the information handling system 400 may support virtual machine (VM) operation, with multiple virtualized instances of one or more operating systems executed in parallel by the information handling system 400. For example, resources, such as processors or processing cores of the information handling system may be assigned to multiple containerized instances of one or more operating systems of the information handling system 400 executed in parallel. A container may, for example, be a virtual machine executed by the information handling system 400 for execution of an instance of an operating system by the information handling system 400. Thus, for example, multiple users may remotely connect to the information handling system 400, such as in a cloud computing configuration, to utilize resources of the information handling system 400, such as memory, processors, and other hardware, firmware, and software capabilities of the information handling system 400. Parallel execution of multiple containers by the information handling system 400 may allow the information handling system 400 to execute tasks for multiple users in parallel secure virtual environments.

In some examples, the information handling system 400 may include or correspond to the computing device 102 of FIG. 1. For example, the processor 402 may correspond to the one or more processors 104, and the memory 404 may correspond to the memory 120. As additional examples, the display device 432 may correspond to any of the display devices 170, 370, and 372. In some examples, the touch-based user input device 150 may be coupled to the USB bus 412. The processor 402 may include or execute the segmenting engine 106 and the user input classification engine 114.

Figure 5:
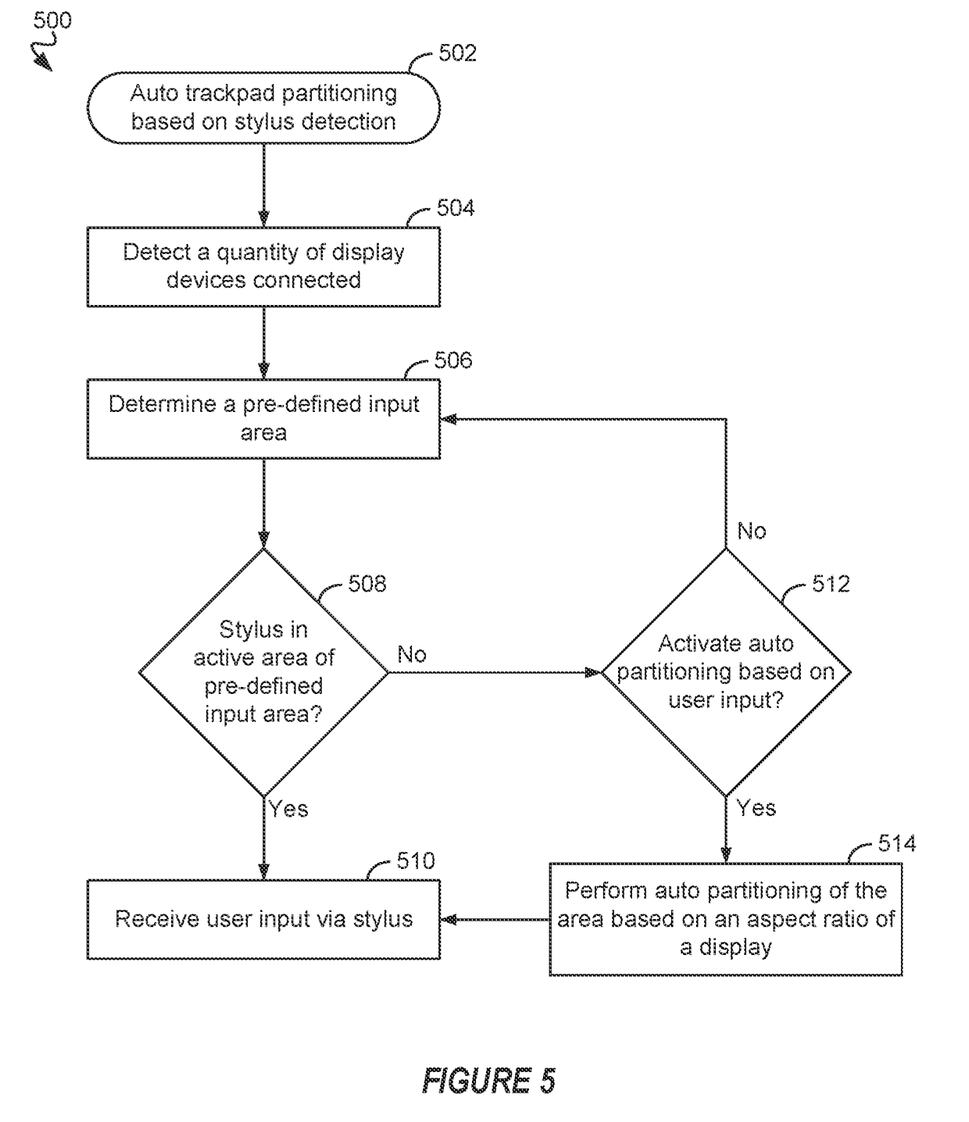
FIG. 5 is a flowchart of an example of a method according to some aspects of the disclosure.

FIG. 5 is a flowchart of an example of a method 500 according to some aspects of the disclosure. In some examples, the method 500 is performed by the computing device 102.

The method 500 may include initiating automatic trackpad partitioning (e.g., partitioning of a trackpad) based on based on stylus detection, at 502. For example, the computing device 102 may perform partitioning of the touch-based user input device 150 (e.g., a trackpad).

The method 500 may further include detecting a quantity of display devices connected, at 504. For example, the computing device 102 may detect that the set of display devices illustrated in FIG. 3 corresponds to three display devices. Other examples are also within the scope of the disclosure.

The method 500 may further include determining or receiving an indication of a predefined area of the trackpad, at 506. For example, in some examples, a user may designate (or "pre-define") a region of the input area 152 for use by the stylus 140.

The method 500 may further include determining whether the stylus is positioned in an active area, at 508. For example, the computing device 102 may detect the user input 142 via the subset 154a.

The method 500 may further include, based on determining that the stylus is positioned in the active area, receiving user input from the stylus on the trackpad, at 510. For example, the computing device 102 may receive the user input 142.

The method 500 may further include, based on determining that the stylus is not positioned in the active area, determining whether to activate an automatic partitioning by the stylus in the trackpad, at 512. For example, the computing device 102 may determine whether to reselect the active area of the input area 152, such as by changing the active area from the subset 154a to the subset 154b. In some examples, the determination may be based on whether the stylus 140 is positioned in a non-active area of the input area 152 for at least a threshold time period.

Based on determining not to activate the automatic partitioning by the stylus in the trackpad, the method 500 may continue to 506. In some other examples, based on determining to activate the automatic partitioning by the stylus in the trackpad, the method 500 may further include performing a system automatic partitioning of a trackpad area based on an aspect ratio of a display (e.g., by reselecting one of the middle, left, and right regions of the trackpad as the active region), at 514. The method 500 may continue to 510.

Figure 6:
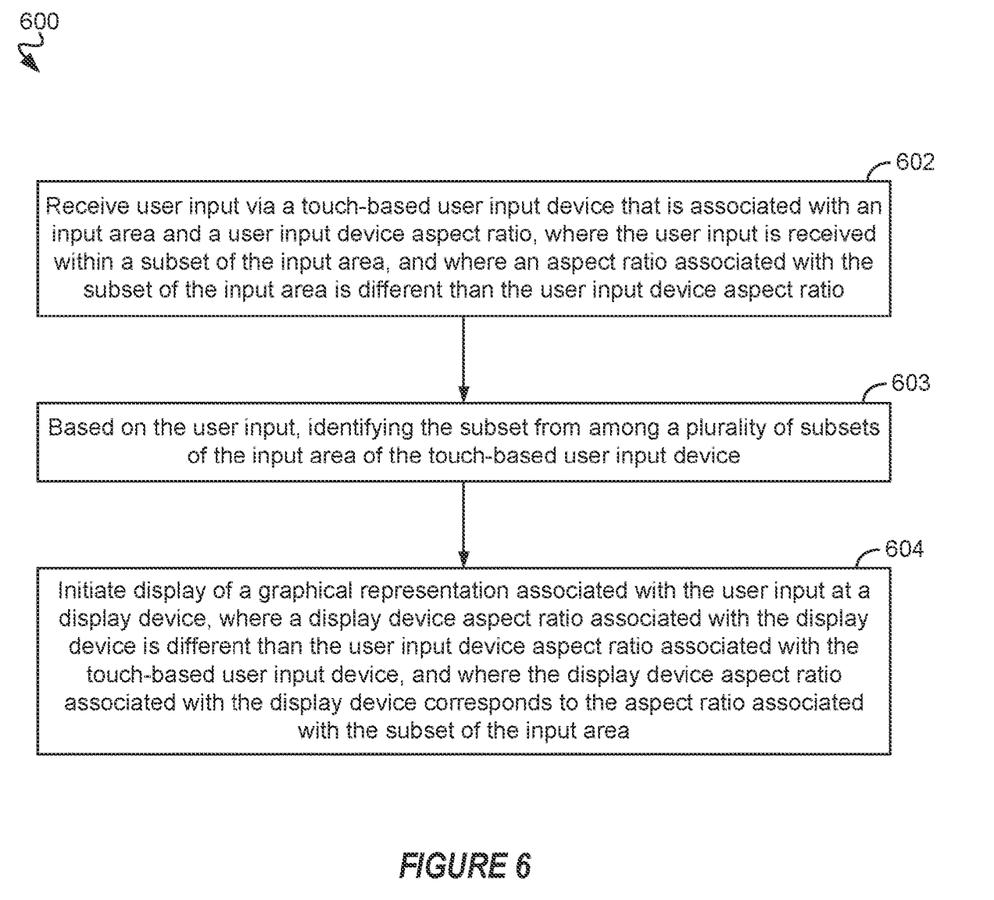
FIG. 6 is a flowchart of another example of a method according to some aspects of the disclosure.

FIG. 6 is a flowchart of another example of a method 600 according to some aspects of the disclosure. In some examples, the method 600 is performed by the computing device 102, such as by the one or more processors 104.

The method 600 includes receiving user input via a touch-based user input device that is associated with an input area and a user input device aspect ratio, at 602. The user input is received within a subset of the input area, and an aspect ratio associated with the subset of the input area is different than the user input device aspect ratio. For example, the one or more processors 104 may receive the one or more signals 130 indicating the user input 142 received at the touch-based user input device 150. The touch-based user input device 150 is associated with the input area 152 and the user input device aspect ratio 108, the user input 142 is received within a subset of the input area (such as any of the subsets 154a-e), and an aspect ratio associated with the subset is different than the user input device aspect ratio.

The method 600 further includes, based on the user input, identifying the subset from among a plurality of subsets of the input area of the touch-based user input device, at 603. For example, the one or more processors 104 may select, based on the user input 142, one of the subsets 154a-b from the subsets 154a-b or one of the subsets 154c-e from the subsets 154c-e.

The method 600 further includes initiating display of a graphical representation associated with the user input at a display device, at 604. A display device aspect ratio associated with the display device is different than the user input device aspect ratio associated with the touch-based user input device, and the display device aspect ratio associated with the display device corresponds to the aspect ratio associated with the subset of the input area. For example, the one or more processors 104 may provide the one or more commands 132 to the display device 170 to initiate display of the graphical representation 172. The display device aspect ratio 110 is different than the user input device aspect ratio 108, and the display device aspect ratio 110 corresponds to the aspect ratio associated with the subset of the input area 152.

In some examples, the graphical representation excludes a representation associated with a second subset of the input area. For example, if the subset corresponds to one of the subsets 154a-b, then the second subset may correspond to the other of the subsets 154a-b, and the graphical representation 172 may exclude a representation associated with the other of the subsets 154a-b. As another example, if the subset corresponds to one of the subsets 154c-e, the second subset may correspond to another of the subsets 154c-e, and the graphical representation 172 may exclude a representation associated with the other of the subsets 154c-e.

One or more aspects described herein may improve user experience and performance of an electronic device, such as the computing device 102. For example, by segmenting the input area 152 into multiple segments, an aspect ratio of a segment may be matched to an aspect area of the display device, such as the display device aspect ratio 110. As a result, distortions associated with an aspect ratio mismatch between the input area 152 and a display device (such as where a circle drawn on the input area 152 is visually represented as an oval on the display device 170 due to the aspect ratio mismatch) may be reduced or avoided. As a result, user experience may be enhanced by reducing instances of the user needing to re-enter user input, which may reduce usage of processing resources and power consumption of the computing device 102 in some cases.

Although certain examples have been described with reference to stylus-based input or finger-based input, those of skill in the art will recognize that other examples are also within the scope of the disclosure. For example, alternatively or in addition to one or more of stylus-based input or finger-based input, a user input device (such as the touch-based user input device 150) may detect gesture input. To illustrate, the touch-based user input device 150 may include one or more sensor arrays that generate an electromagnetic signal (e.g., an infrared signal) or an acoustic signal and that detect reflection of the electromagnetic or acoustic signal to receive gesture input, such as positioning and orientation of the face or fingers of a user. In some examples, the gesture input is included in or corresponds to the user input 142 (e.g., alternatively or in addition to user input from the stylus 140).

A diagram described herein may be generally set forth as a logical flowchart diagram. As such, the depicted order and labeled steps may be indicative of aspects of the disclosed method. Other steps and methods may also be used to implement one or more steps, or portions thereof, of the illustrated method. Additionally, the format and symbols employed are provided to explain the logical steps of the method and are understood not to limit the scope of the method. Although various arrow types and line types may be employed in the flowchart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

One or more operations described herein may be described as being performed by a controller or processor. Such operations may be performed by any circuit configured to perform the operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus comprising:
a memory; and
one or more processors coupled to the memory, wherein the one or more processors are configured to:
receive user input via a touch-based user input device having a user input device aspect ratio, wherein the user input is received within a subset of an input area of the touch-based user input device, and wherein an aspect ratio associated with the subset of the input area is different than the user input device aspect ratio;
based on the user input, identify the subset from among a plurality of subsets of the input area of the touch-based user input device, wherein a quantity of subsets included in the plurality of subsets corresponds to a quantity of display devices included in a set of display devices; and
initiate display of a graphical representation associated with the user input at a display device of the set of display devices having a display device aspect ratio different than the user input device aspect ratio, wherein the display device aspect ratio corresponds to the aspect ratio associated with the subset of the input area.

2. The apparatus of claim 1, wherein the one or more processors are further configured to:
prior to receiving the user input, perform segmenting of the input area of the touch-based user input device into the plurality of subsets including the subset and at least a second subset; and
select the subset, from among the plurality of subsets, as an active area of the input area based on the user input being detected within the subset.

3. The apparatus of claim 2, wherein the one or more processors are further configured to:
detect a type of input associated with the user input; and
identify the subset as the active area based the type of input.

4. The apparatus of claim 3, wherein the type of input corresponds to a stylus-based input type.

5. The apparatus of claim 2, wherein the one or more processors are further configured to:
receive additional user input via the touch-based user input device; and
based on a finger-based input type associated with the additional user input, processing the additional user input based on the display device aspect ratio.

6. The apparatus of claim 1, wherein the one or more processors are further configured to:
detect the set of display devices; and
segment the touch-based user input device based on the quantity of display devices included in the set of display devices.

7. The apparatus of claim 6, wherein the one or more processors are further configured to segment the input area of the touch-based user input device by mapping each subset of the plurality of subsets of the input area of the touch-based user input device to a respective display device of the set of display devices.

8. The apparatus of claim 7, wherein the one or more processors are further configured to:
receive second user input via a second subset of the input area of the touch-based user input device; and initiate display of a second graphical representation of the second user input at a second display device of the set of display devices, wherein a second display device aspect ratio associated with the second display device corresponds to a second aspect ratio associated with the second subset of the input area.

9. The apparatus of claim 7, wherein the mapping is based on a physical arrangement of the set of display devices.

10. The apparatus of claim 1, further comprising a computing device that includes the one or more processors, the memory, the touch-based user input device, and the display device.

11. A method comprising:
receiving user input via a touch-based user input device that is associated with an input area and a user input device aspect ratio, wherein the user input is received within a subset of the input area, and wherein an aspect ratio associated with the subset of the input area is different than the user input device aspect ratio;
based on the user input, identifying the subset from among a plurality of subsets of the input area of the touch-based user input device, wherein a quantity of subsets included in the plurality of subsets corresponds to a quantity of display devices included in a set of display devices; and
initiating display of a graphical representation associated with the user input at a display device of the set of display devices, wherein a display device aspect ratio associated with the display device is different than the user input device aspect ratio associated with the touch-based user input device, and wherein the display device aspect ratio associated with the display device corresponds to the aspect ratio associated with the subset of the input area.

12. The method of claim 11, wherein a portion of the user input is received from a second subset of the input area of the touch-based user input device.

13. The method of claim 12, wherein, based on the portion of the user input being received from the second subset, the portion of the user input is not included in the graphical representation.

14. The method of claim 11, further comprising:
detecting an interruption in the user input;
after detecting the interruption in the user input, detecting second user input within a second subset of the input area; and
based on the second user input within the second subset of the input area, dynamically selecting the second subset of the input area as an active area.

15. The method of claim 14, further comprising initiating display of a second graphical representation of the second user input at the display device.

16. The method of claim 15, wherein the graphical representation and the second graphical representation are displayed concurrently at the display device.

17. The method of claim 15, further comprising removing the graphical representation from the display device based on initiating the display of the second graphical representation.

18. An information handling system comprising:
a memory; and
a processor coupled to the memory, wherein the processor is configured to:
receive user input via a touch-based user input device that is associated with an input area and a user input device aspect ratio, wherein the user input is received within a subset of the input area, and wherein an aspect ratio associated with the subset of the input area is different than the user input device aspect ratio;
based on the user input, identify the subset from among a plurality of subsets of the input area of the touch-based user input device, wherein a quantity of subsets included in the plurality of subsets corresponds to a quantity of display devices included in a set of display devices; and
initiate display of a graphical representation associated with the user input at a display device of the set of display devices, wherein a display device aspect ratio associated with the display device is different than the user input device aspect ratio associated with the touch-based user input device, and wherein the display device aspect ratio associated with the display device corresponds to the aspect ratio associated with the subset of the input area.

19. The information handling system of claim 18, wherein the touch-based user input device corresponds to a trackpad having a same width as, and extending edge-to-edge with, the display device.

20. The information handling system of claim 18, wherein the user input is depicted at the display device as the graphical representation without scaling the user input based on the display device aspect ratio.

* * * * *